(12) United States Patent
Gudenburr et al.

(10) Patent No.: US 7,949,177 B2
(45) Date of Patent: May 24, 2011

(54) BI-DIRECTIONAL MAGNETIC CHARACTER READER

(75) Inventors: John C. Gudenburr, Canton, MI (US); Michael J. Moore, Beverly Hills, MI (US); William L. Kozlowski, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 838 days.

(21) Appl. No.: 11/950,461

(22) Filed: Dec. 5, 2007

(65) Prior Publication Data

US 2009/0148028 A1 Jun. 11, 2009

(51) Int. Cl.
*G06K 7/08* (2006.01)

(52) U.S. Cl. ........ 382/139; 382/137; 382/140; 382/313; 382/320

(58) Field of Classification Search .................. 382/137, 382/139, 140, 313, 320; 358/474, 497, 487, 358/506, 473; 380/243
See application file for complete search history.

(56) References Cited

U.S. PATENT DOCUMENTS

| | | | | |
|---|---|---|---|---|
| 5,054,092 A * | 10/1991 | LaCaze | 382/139 |
| 5,134,663 A * | 7/1992 | Kozlowski | 382/139 |
| 5,257,319 A * | 10/1993 | Canu et al. | 382/139 |
| 5,308,959 A * | 5/1994 | Cherry | 235/379 |
| 5,524,063 A * | 6/1996 | Henrot | 382/139 |
| 5,729,621 A * | 3/1998 | Marshall et al. | 382/139 |
| 5,825,946 A * | 10/1998 | Del Signore et al. | 382/320 |
| 6,659,347 B1 * | 12/2003 | Moore et al. | 235/449 |
| 7,474,780 B2 * | 1/2009 | Volpa | 382/139 |
| 2005/0053271 A1 * | 3/2005 | Duncan | 382/137 |

* cited by examiner

*Primary Examiner* — Twyler L Haskins
*Assistant Examiner* — Kent Yip
(74) *Attorney, Agent, or Firm* — Honigman Miller Schwartz and Cohn LLP (57) ABSTRACT

A manually operated document scanner and methods of operation and use are disclosed. The document scanner includes a document bed having a document positioning surface. The document scanner also includes a scanner module slidably attached to the document bed. The scanner module has a magnetic character reader, a first magnet placed along a leading edge of the magnetic character reader in a first direction of travel of the scanner module, and a second magnet placed along a leading edge of the magnetic character reader in a second direction of travel of the scanner module opposite to the first direction of travel.

18 Claims, 7 Drawing Sheets

BI-DIRECTIONAL MAGNETIC CHARACTER READER

TECHNICAL FIELD

The present disclosure relates generally to a magnetic character reader in a manually operable document reader. More specifically, the present disclosure relates to a bi-directional magnetic character reader.

BACKGROUND

A transfer of funds can lag a business transaction, such as a purchase, by many days if a check or other negotiable instrument is used. This is because routing information must be read and processed, and the document must be transferred to a bank for finds to be exchanged. It is advantageous to companies or institutions accepting checks as a form of payment to process those checks as soon as possible after a transaction occurs, so that those companies can obtain and use the funds related to that transaction.

To speed check processing, it can be advantageous to electronically read routing information on checks and also to scan checks or other documents representing a purchase. However, check scanning equipment can be expensive and error prone. Some check scanning systems scan checks multiple times to increase their reliability; however, these systems are generally complex and require additional passes of a scanner element along the document.

For these and other reasons, improvements are desirable.

SUMMARY

In accordance with the following disclosure, the above and other problems are solved by the following:

In a first aspect, a manually operated document reader is disclosed. The document reader includes a document bed having a document positioning surface. The document reader also includes a scanner module slidably attached to the document bed. The scanner module has a magnetic character reader, a first magnet placed along a leading edge of the magnetic character reader in a first direction of travel of the scanner module, and a second magnet placed along a leading edge of the magnetic character reader in a second direction of travel of the scanner module opposite to the first direction of travel.

In a second aspect, a method of reading magnetized characters using a manually operated document reader is disclosed. The method includes obtaining a signal representative of a magnetized character printed on a document using a manually-operated scanner module passing across a printed document in a first direction, the scanner module including a magnetic character reader. The method further includes obtaining a second signal representative of the magnetized character using the manually operated scanner module passing across the printed document in a second direction. The method also includes validating the signal using the second signal.

In a third aspect, a method of operating a manually-operated document reader is disclosed. The method includes manually passing a scanner module across a document in a first direction to obtain a signal representative of a magnetized character printed on the document, the scanner module including a magnetic character reader. The method further includes passing a scanner module across the document in a second direction opposite to the first direction to obtain a second signal representative of the magnetized character printed on the document.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set fort in this specification are not intended to be limiting and merely set forth some of the many possible embodiments for the claimed invention.

In general, the present disclosure relates to a document reader, such as a check scanner. Specifically, the present disclosure relates to a manually operated document reader that includes a magnetic character reader capable of reading magnetized characters when the magnetic character reader passes in either direction across the character. In certain embodiments, algorithms are applied to the output of the magnetic character reader to validate recognition of a character when the reader passes in a first direction with data obtained when the reader passes in an opposite direction across the character.

Figure 1:
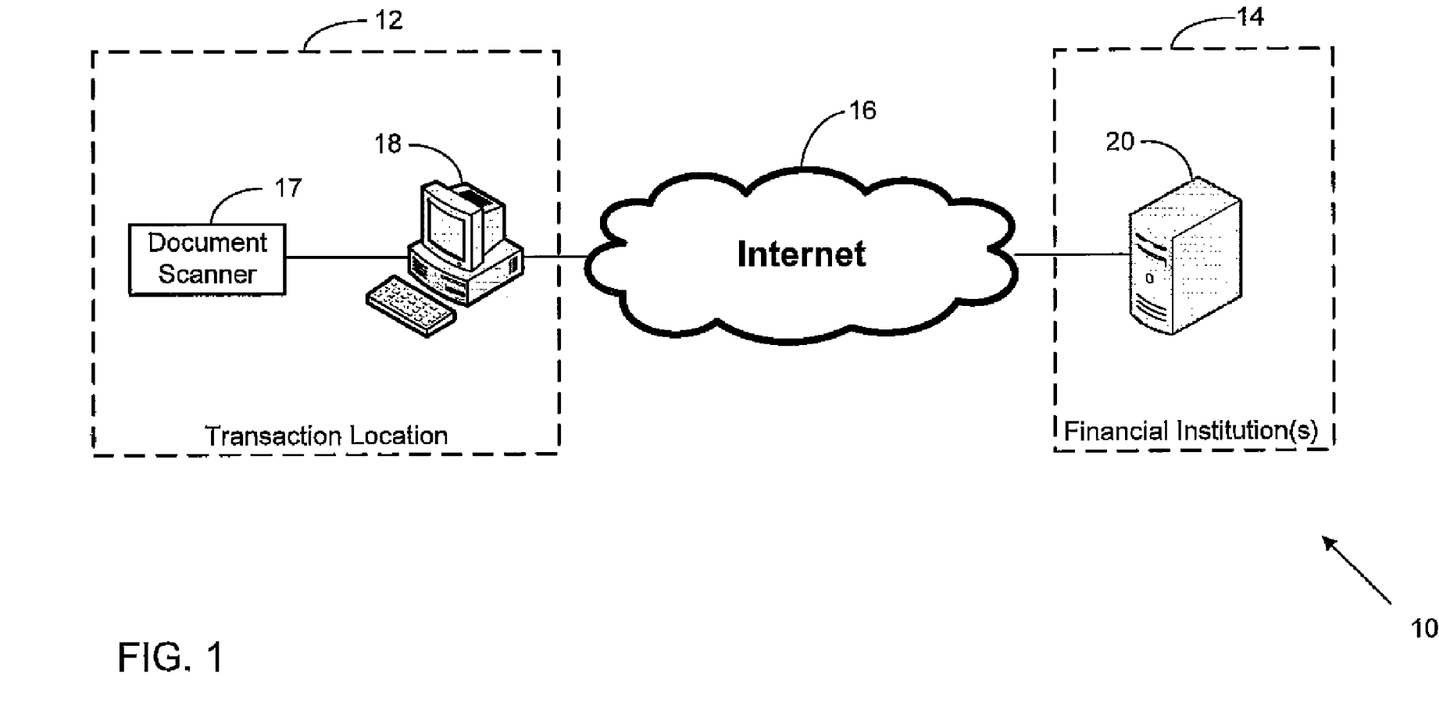
FIG. 1 is a schematic depiction of a network in which an electronic financial transaction may be placed, in accordance with the present disclosure.

One specific example of a system in which such a bidirectional document reader or scanner may be used is shown in FIG. 1. FIG. 1 illustrates a schematic view of a network 10 in which a financial transaction may take place, according to a possible embodiment of the present disclosure. The network 10 generally includes one or more transaction locations 12 and financial institutions 14, communicatively connected by a network, shown as the internet 16. A transaction location 12 may be any of a number of places of business at which a financial transaction may take place, such as for purchase or sale of goods and services. Example transaction locations may include restaurants, supermarkets, or other places of business. Each transaction location 12 includes a document scanner 17 interconnected with a computing system 18. The document scanner 17 is arranged to provide the transaction location with the ability to electronically acquire information about a printed document, such as a check used for payment in exchange for goods and/or services. In certain embodiments, the document scanner 17 can be a check scanner, which is sized and designed to be a low cost solution to read account information on personal checks and scan images of one or both sides of the check. An example document scanner useable in the network 10 is described below in conjunction with FIGS. 2-4.

The computing system 18 can be any of a number of types of computing systems, such as a general purpose personal computer, or a specialized computer such as a cash register or inventory system. The computing system 18 can interconnect with the document scanner 17 by any of a number of standard or specialized communication interfaces, such as a USB, 802.11 a/b/g network, RF, infrared, serial, or other data connection. In certain embodiments, the computing system 18 runs an application configured to control the document scanner 17; in further embodiments, the computing system 18 receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing systems 18, 20 at different, specific locations are depicted, the computing devices and/or the document scanner 17 may be located at the same location or within the same network.

Figure 2:
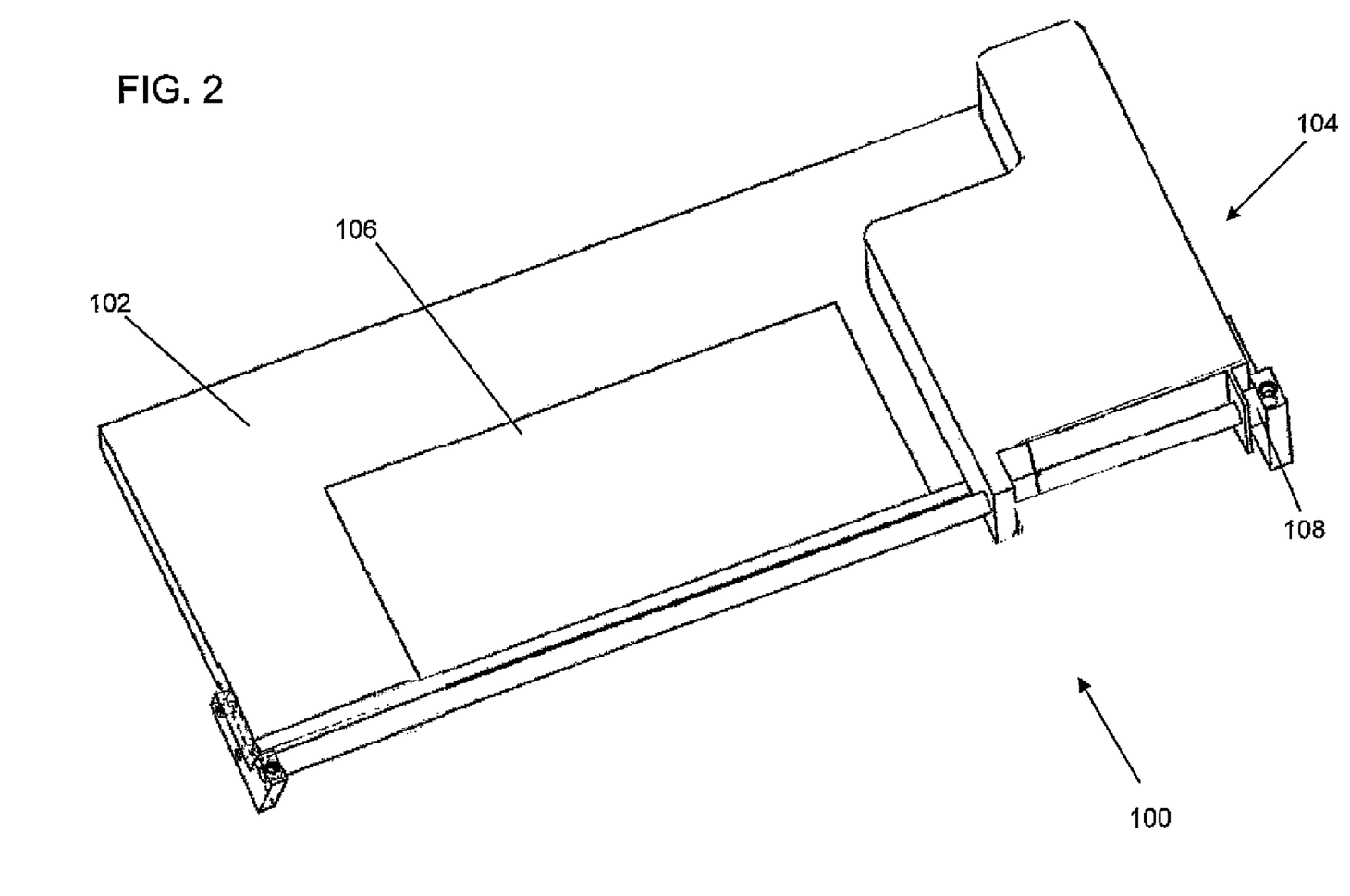
FIG. 2 is a front perspective view of a document reader having an optical movement sensor, according to a possible embodiment of the present disclosure.
Figure 3:
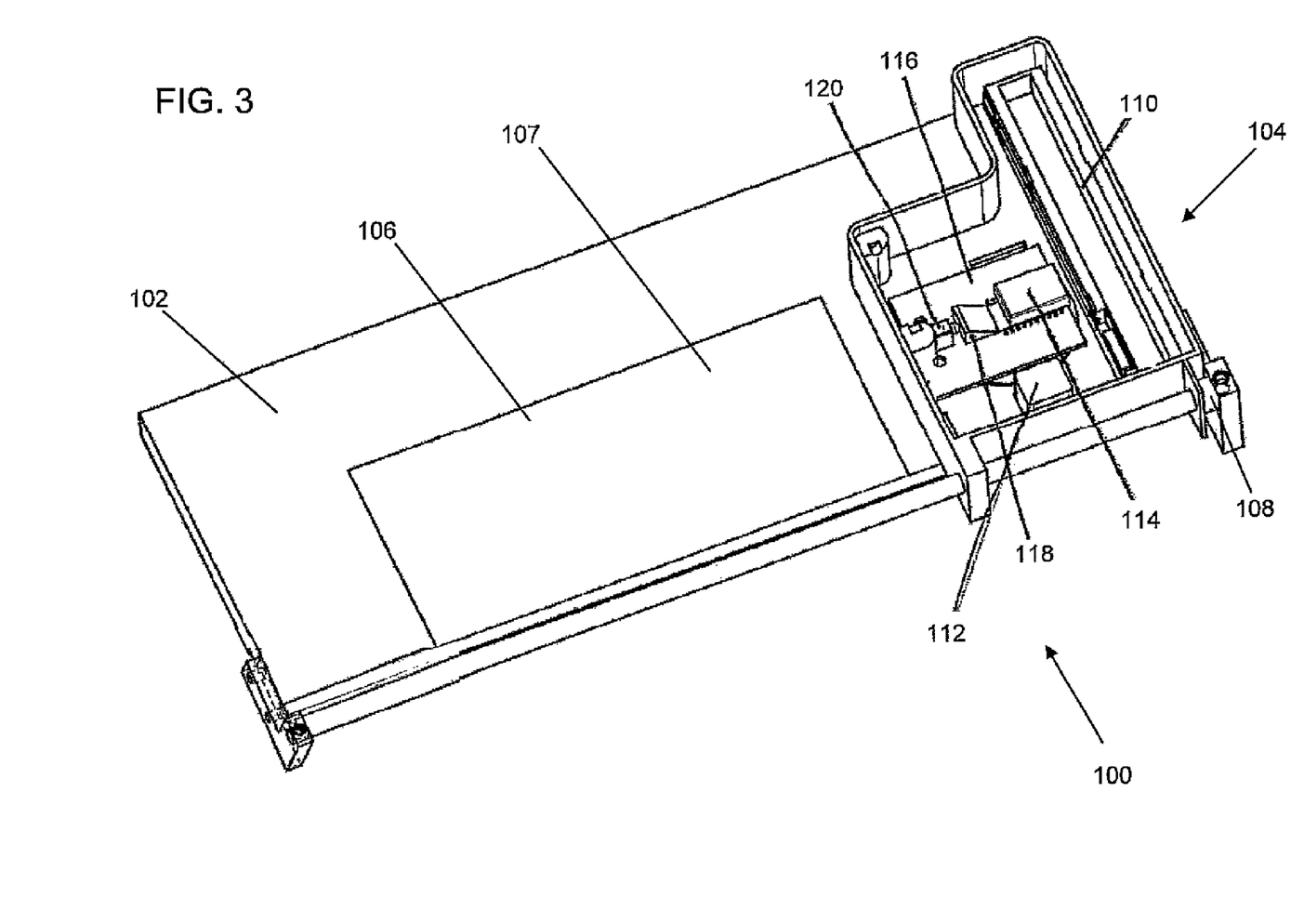
FIG. 3 is a front perspective view of the document reader of claim 2, with a cover removed from the scanner module.
Figure 4:
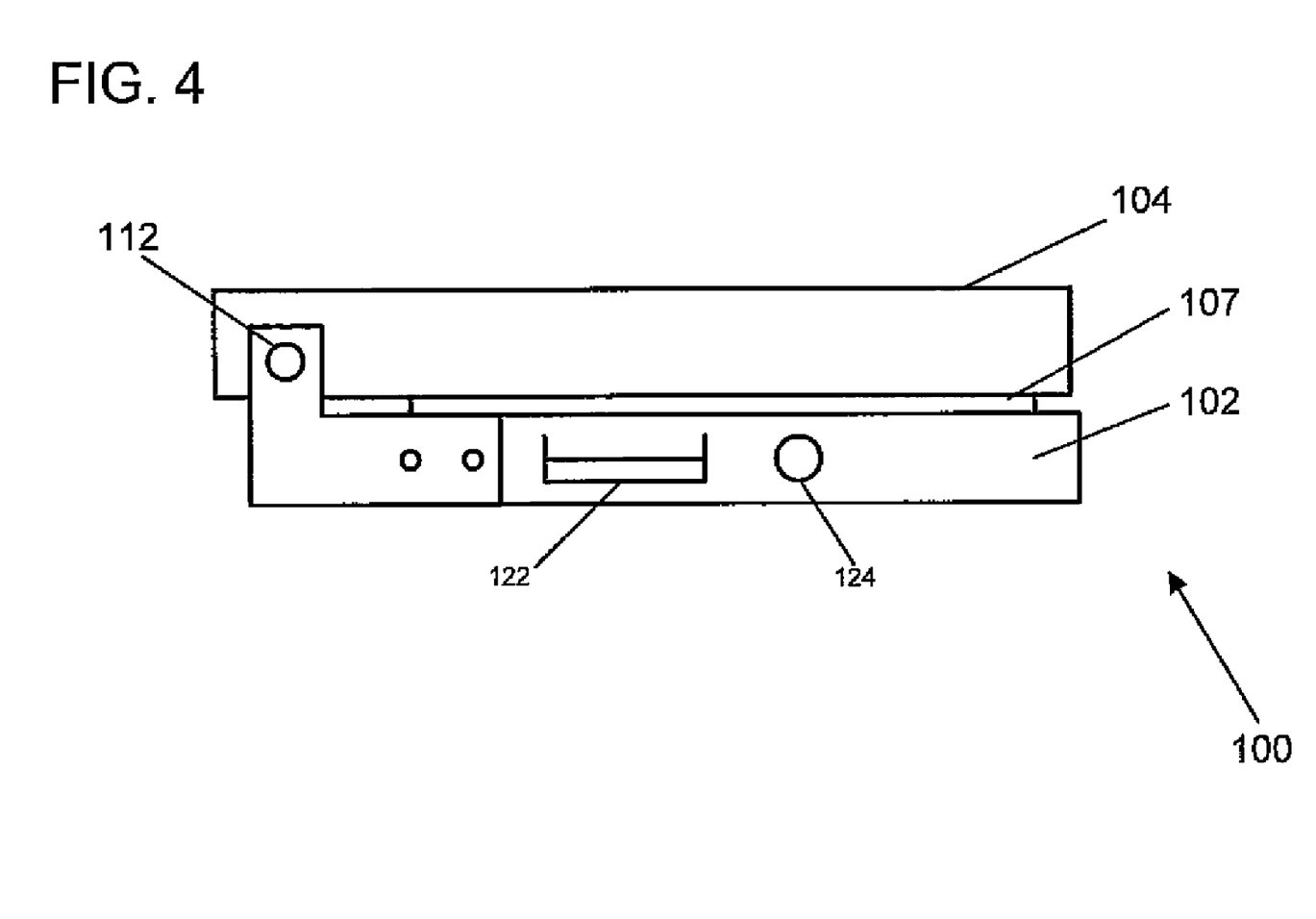
FIG. 4 is a side plan view of the document reader of FIG. 2.

Now referring to FIGS. 2-4, one possible manually-operated document reader which implements aspects of the present disclosure is shown. Although in FIGS. 2-4 the present disclosure relates primarily to recognition of magnetic characters printed on checks or other documents from financial institutions, other magnetic characters placed in other positions on a document may be read and validated according to the same principles. Furthermore, the various embodiments in which the magnetic character reader and algorithms of the present disclosure may be implemented will vary according to the specific document to be scanned.

FIG. 2 is a front perspective view of a document reader 100 having an optical movement sensor, according to a possible embodiment of the present disclosure. In certain embodiments, the document reader 100 can correspond to the document scanner 17 of FIG. 1. The document reader 100 is generally configured to be a low-cost, manually operated electronic information capture device capable of scanning/reading images and characters printed on a document.

The document reader generally includes a document bed 102 and a scanner module 104. The document bed 102 includes a document positioning surface 106, which is configured to receive a document for scanning. In the embodiment shown, the document bed 102 and document positioning surface 106 are sized to receive a personal or business check for scanning; however, in various other embodiments, additional sizes/configurations of documents may be used as well.

The scanner module 104 is slidably attached to the document bed 102 along a slider bar 108. The slider bar 108 is mounted along a side of the document bed, such that the scanner module 104 can be manually passed along the entire length of the document positioning surface 106. In the embodiment shown, the scanner module 104 also rotationally attaches to the slider bar 108 to allow the scanner module to be lifted away from the document positioning surface. The scanner module 104 is generally of approximately the same width as the document bed 102 and/or document positioning surface 106, and can include one or more scanning elements configured to capture information about the document (e.g. a check) placed on the document positioning surface as the module is manually passed over the surface of the document. In the embodiment shown, the slider bar 108 resides along a single side of the document bed 102; however in further embodiments, additional slider bars or retention mechanisms can be used to retain and/or guide the scanner module along the length of the document bed.

Referring now to FIG. 3, a front perspective view of the document reader 100 is shown with a cover removed from the scanner module 104. The scanner module 104 includes a contact image sensor 110 and a magnetic character reader 112. The contact image sensor 110 includes a linear scan element which can be used to scan an image of a document placed under it. The contact image sensor 110 is passed across a document, such as a check, on the document positioning surface 106. The contact image sensor 110 is configured to collect a line of pixels at regular intervals, in certain embodiments up to and exceeding 3,000 samples per second. The speed at which the sensor 110 passes across the document determines the resolution at which the document is captured. In the embodiment shown, the contact image contact image sensor 110 is arranged to pass 0.010 inch from the document positioning surface 106, allowing a document to pass closely thereunder. Other distances may be employed as well.

In certain embodiments, the image data is transferred to a computing system interconnected with the document reader 100, such as computing system 18 of FIG. 1, where it is combined with the movement information provided by the movement sensor 114 (described below) to correct for speed variations in the manual process and provide an image with a fixed spatial resolution. In still other embodiments, the movement information provided by the movement sensor 114 is used by components located on the printed circuit board 116 to control the image sensor 110 in such a way to acquire image data at a fixed spatial resolution.

The magnetic character reader 112, when the scanner module 104 is passed across the document, scans magnetic characters located beneath the reader. For example, the magnetic character reader 112 can sense magnetic printing representing routing and account information that are printed on checks, deposit slips, or other similar documents. In certain embodiments, the magnetic character reader 112 can be configured to collect data at regular time intervals; in one embodiment, the magnetic character reader 112 can collect data 10000 samples per second. In these embodiments, the collected data can be transferred to a computing system communicatively connected to the document reader 100, where it is combined with the movement information provided by the movement sensor 114 to correct for speed variations and provide data with a fixed spatial resolution. In other embodiments, the movement information provided by the movement sensor 114 is used by components located on the printed circuit board 116 to control the magnetic character reader 112 to acquire data at a fixed spatial resolution. Various algorithms can be used in the computing system or on the document reader 100 to transform the data collected into alphanumeric characters or symbols, as described in greater detail below.

A movement sensor 114 is mounted to a printed circuit board 116 within the scanner module 104. The movement sensor 114 detects movement of the scanner module 104 with respect to the document positioning surface 106 or with respect to the document 107. The movement sensor 114 provides the captured movement information used to compensate for speed variations in the manual scanning process. In the embodiment shown, the movement sensor 114 is an optical mouse sensor configured to be included in and detect movement of a mouse. In further embodiments other position or speed sensing systems, such as by a radial encoder or other position determination device, can be implemented in place of the specific movement sensor shown.

In conjunction with the movement sensor 114, an optical light pipe 118 and a light emitting diode 120 are mounted to the printed circuit board 116 as well. The light emitting diode 120 generates light of a specific frequency detectable by the optical movement sensor, and the optical light pipe 118 directs the light toward the movement sensor 114 for detection. Additional components can be added to the printed circuit board 116 for additional functionality as well. Of course, in the instance in which the movement sensor 114 is not an optical sensor, these additional components could be excluded from the scanner module altogether.

In one embodiment of the scanner module 104, the movement sensor 114 detects positional changes occurring at a given sampling rate. The change in position of the movement sensor 114 and therefore the scanner module 104 is provided as an input to circuitry on the printed circuit board 116 which controls the sampling rate of the contact image sensor 110 and the magnetic character reader 112. These components also scan portions of the document at a given sampling rate, and determine a physical distance between the samples based on the calculated speed of the scanner module 104 at that time, as computed based on data collected by the movement sensor 114.

Furthermore, although a specific location of the components in the scanner module 104 is shown, other applications and locations for the contact image sensor 110, magnetic character reader 112, and optical movement sensor 114 are possible as well. Furthermore, additional circuitry can be incorporated into the scanner module 104 as well, such as a memory arranged to store the data acquired by the sensor 110 and magnetic character reader 112.

FIG. 4 is a side plan view of the document reader 100, and shows the vertical layout of the various components of the document reader. In the system as shown, a document 107 resides on the document bed 102. The scanner module 104, mounted to the document bed 102 by the slider bar 108, rests on the document 107 such that it extends across the width of the document. The side of the scanner module 104 is preferably a low-friction surface including the various required scanning/reading components, as previously described; The document positioning surface 106 (seen in FIGS. 2-3, above) is preferably a high-friction surface able to maintain the position of the document 107 as the scanner module 104 passes across it to scan the images/text on the document.

The document reader 100 includes a communication connection 122 and a power connection 124. The communication connection 122 provides an interconnection location for connecting the document reader to an external computing system, such as the computing system 18 of FIG. 1. In the embodiment shown, the communication connection 122 is a USB connection; however, other types of communication interfaces can be used, such as a serial connection, RJ-45 or other packet-based wired connection system, Bluetooth, IR, RF, or other connection systems. The power connection 124 receives a power connector, such as an AC or DC power connection configured to provide electrical power to the various scanning components of the document reader 100. Although the document reader 100 is shown as having both a communication connection 122 and power connection 124, in certain embodiments, power to the document reader 100 can be supplied by the communication connection, such as in the case of a USB or Firewire connection. Other types of connections can allow for power delivery over a communications interface as well. Furthermore, in the embodiment shown, the communication connection 122 and power connection 124 are located on a side of the document bed 102; in other embodiments, the connections can be located on a different side of the bed or on a side of the scanner module 104.

Figure 5:
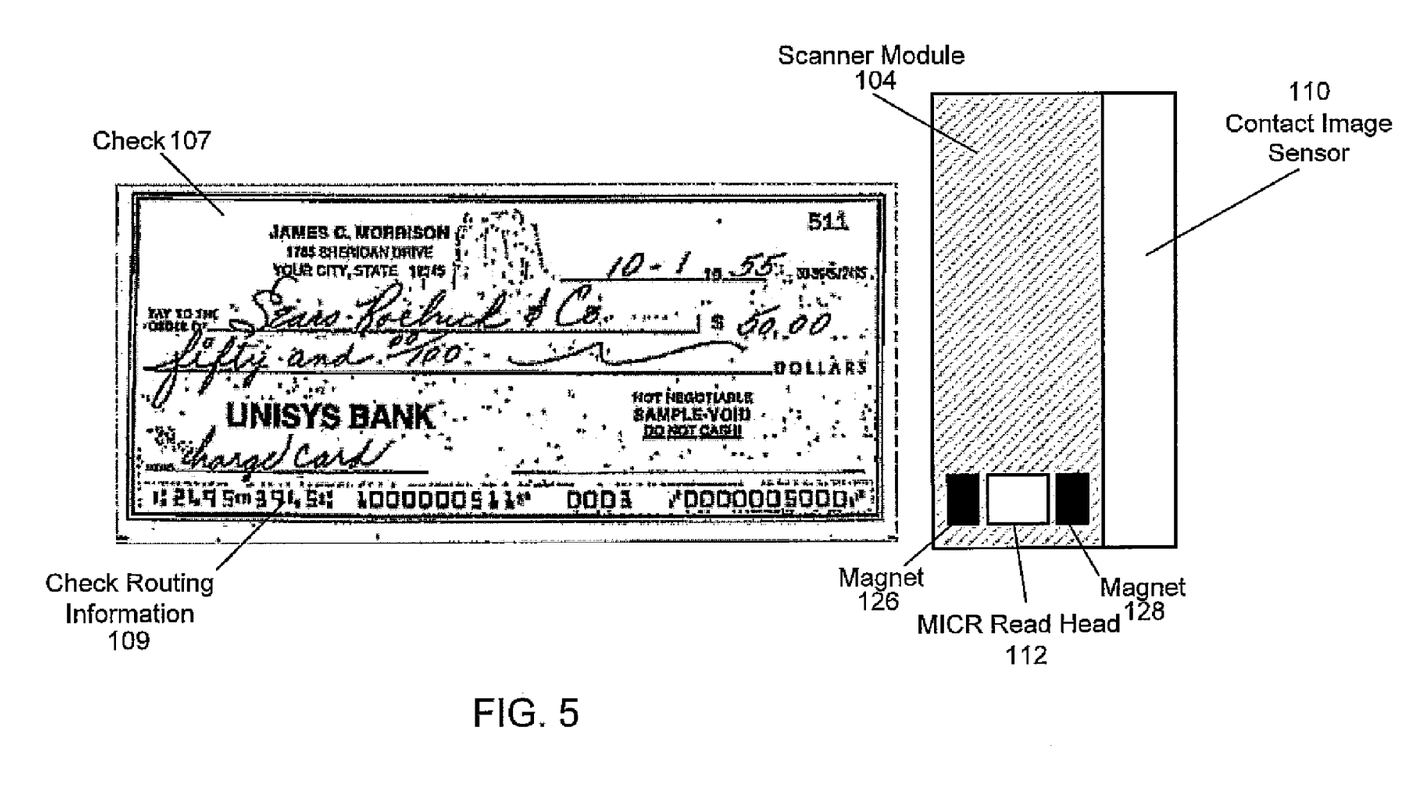
FIG. 5 is a schematic view of a magnetic character reader passing across a check, in accordance with principles of the present disclosure.

FIG. 5 is a schematic view of the magnetic character reader 112 of FIG. 3 passing across a document, such as a check, in accordance with principles of the present disclosure. As shown, the magnetic character reader 112 is aligned with at least one character 109 printed on a document 107, such as a check. The characters 109 aligned with the magnetic character reader 112 are printed using a type of ink upon which a magnetic field can be induced, such as an ink incorporating iron oxide or some other type of metallic element. In the embodiment shown, the magnetic character reader is aligned with check routing and account information on a check. Magnets 126, 128 placed on opposing sides of the magnetic character reader 112 within the scanner module 104 induce a magnetic field on the character 109 prior to the magnetic character reader 112 passing over each character. Specifically, in the configuration shown, magnet 126 charges the characters 109 prior to the magnetic character reader 112 passing over those characters when the scanner module is passed over the characters in a first direction (e.g. from right to left, as shown. As the magnetic character reader 112 passes over the character, an electrical signal is induced in the reader. The electrical signal has a unique signature which corresponds to the character passed over by the reader. As the scanner module is returned from the left side of the document 107 to the right side, magnet 128 induces a magnetic field on the characters 109, allowing the magnetic character reader 112 again to obtain an indication of the printed character by having induced within it an electrical signal indicative of that character.

Figure 6:
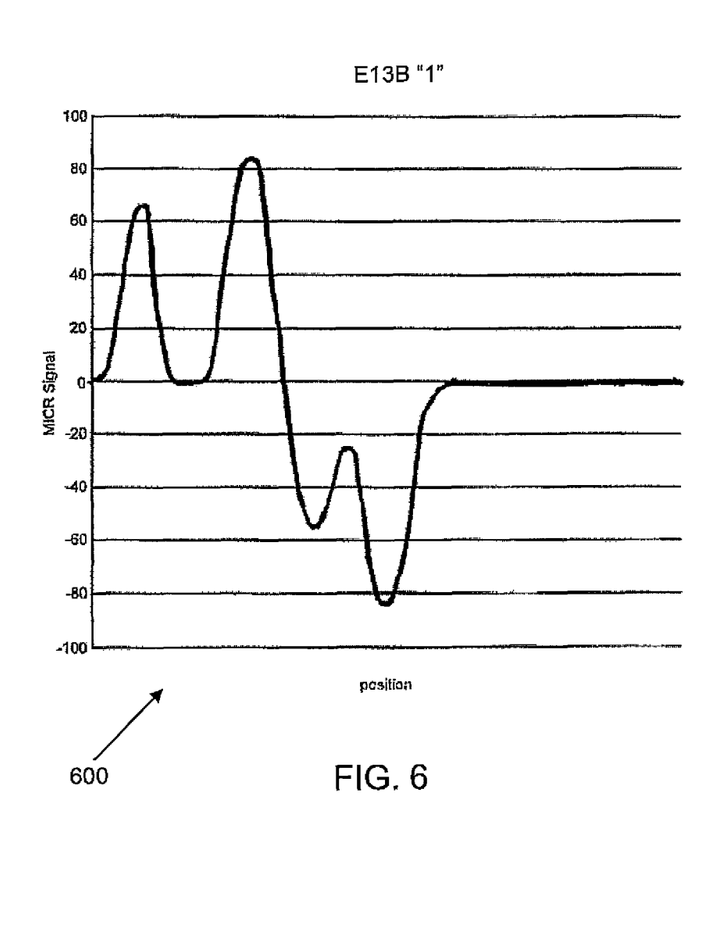
FIGS. 6-7 illustrate example signals received by a magnetic character reader passing across a numeral.
Figure 7:
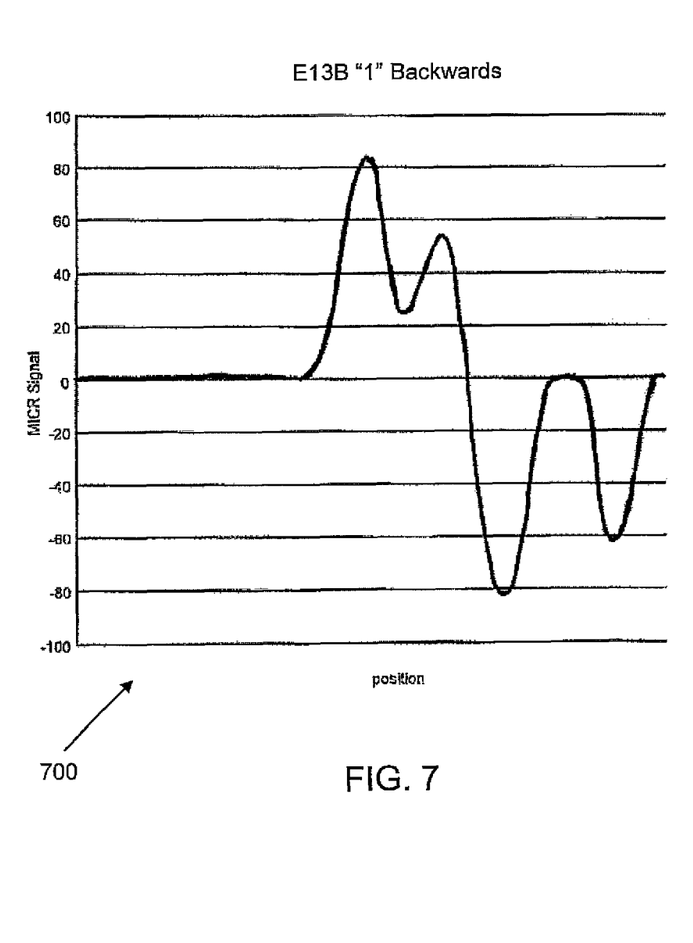

The opposite directions of travel of the scanner module 104 result in the magnetic character reader 112 obtaining inverse magnetic character signals from each character read. Example inverse signals are shown in FIGS. 6-7, which provide example signals received by a magnetic character reader passing across a numeral "1". FIG. 6 illustrates a forward signal 600 obtained by passing the magnetic character reader 112 over a numeral "1" in a "forward" direction, shown in FIG. 5 as a right to left direction (with magnetic field applied by magnet 126). FIG. 7 illustrates a reverse signal 700 obtained by passing the magnetic character reader 112 over the same numeral "1" in a "reverse" direction, shown in FIG. 5 as a left to right direction (with magnetic field applied by magnet 128). As can be seen in these figures, the forward signal 600 is of opposite polarity and position to the reverse signal 700. The signals of opposite polarity and position can be compared through a number of techniques in order to validate that characters recognized in the first pass of the scan module are the same characters as are recognized in the second pass of the scan module, in the opposite direction. Certain example techniques are described below in conjunction with FIG. 8.

Figure 8:
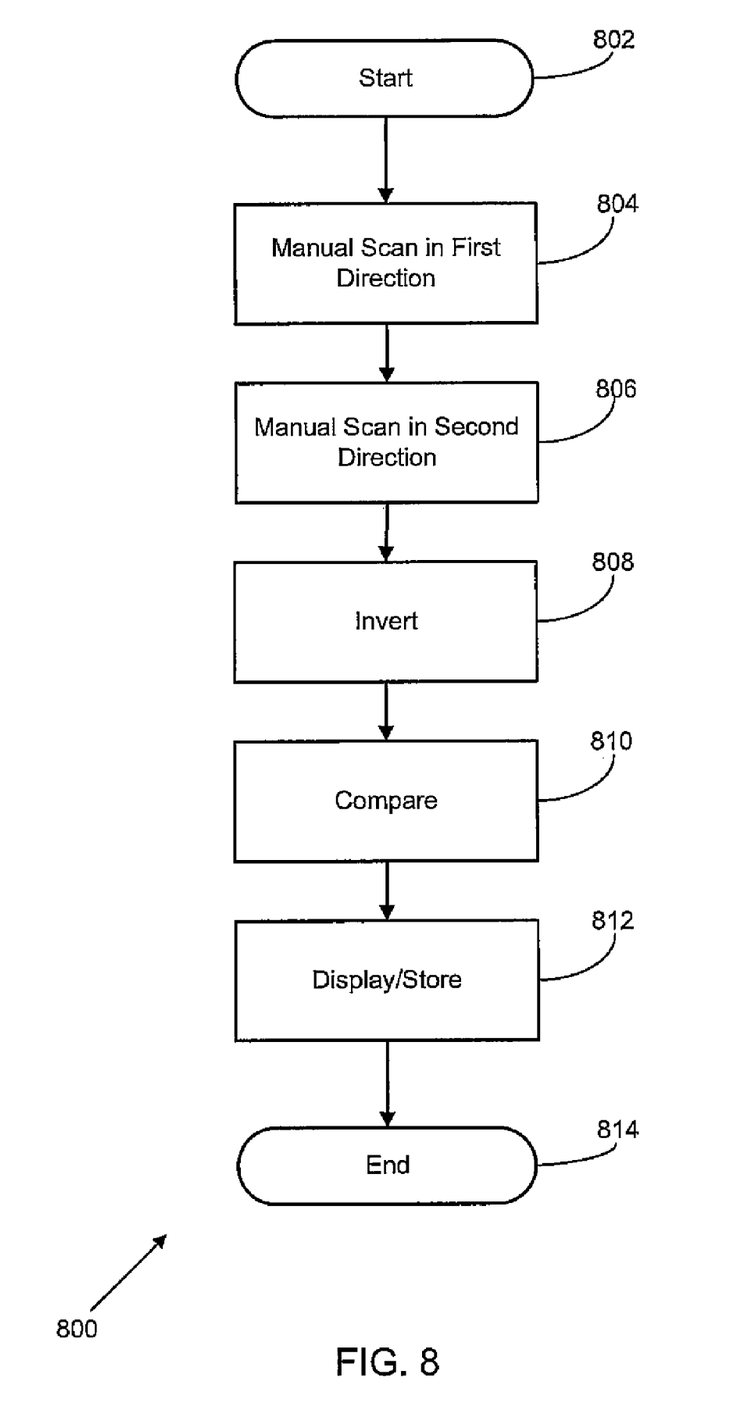
FIG. 8 is a flowchart illustrating methods and systems for operating a document reader according to a possible embodiment of the present disclosure.

FIG. 8 is a flowchart illustrating methods and systems for operating a document reader according to a possible embodiment of the present disclosure. The system 800 shown corresponds to use and/or operation of a manually operated document reader, such as the check scanner disclosed above. In one embodiment, the system 800 corresponds to use and operation of the document reader disclosed above in conjunction with FIGS. 2-5. However, the system 800 can be incorporated into other types of check scanners or document readers in a manner consistent with the principles of the present disclosure.

Operational flow within the system 800 is instantiated at a start operation 802 which corresponds to placing a document, such as a check, on a document bed or otherwise preparing to electronically capture information from a document using a magnetic character reader. Operational flow proceeds to a first scan module 804. The first scan module 804 corresponds to receiving a signal from a magnetic character reader that results from manually passing a scanner module (and integrated magnetic character reader) over a document such as the check shown in FIG. 5, in a first direction. In a possible embodiment, the first scan module 804 corresponds to sliding the scanner module 104 along the slider bar 108 from the right to the left to pass over the check.

The first scan module 804 optionally correlates the signal obtained from the magnetic character reader (e.g. the magnetic character reader 112 of FIGS. 3, 5) to a character, such as an alphanumeric character or a character of a specific font arranged to be readable by the magnetic character reader. This can be accomplished, for example, by matching the signal with predefined templates corresponding to possible characters printed in one or more fonts. Fonts used can include the E-13B font or CMC-7 font. Other characters and fonts can be used as well. In one embodiment, the signal obtained using the first scan module 804 can be stored into memory of either the document reader or a communicatively connected computing system, as described above in conjunction with FIG. 1. In further embodiments, other temporary storage techniques can be employed.

Operational flow proceeds to a second scan module 806, which corresponds to the first scan module 804 but occurs when the scanner module 104 is passed in an opposite direction across the document. The second scan module 806 obtains a second signal corresponding to, but inverse of the first signal. By inverse, it is intended that the second signal is opposite to the first signal both in terms of position and magnitude of the magnetic field detected. In various embodiments, this second signal can also be stored in a memory of the document reader or an affiliated computing system.

Operational flow proceeds to a plurality of validation modules which compare the first and second signals to improve the system's confidence that the signals refer to the correct alphanumeric character. A first of the validation modules is an invert module 808, which inverts the position of at least one of the first and second signals. The invert module 808 also optionally inverts the magnitude of one of the signals, depending upon the validation technique used. In various embodiments of the present disclosure, the invert module 808 can act on both signals captured relating to the same alphanumeric character; for example, one signal can be inverted in position while the other signal can be inverted in magnitude. In further embodiments, the invert module 808 acts upon only one of the two signals, either by inverting the position of the signal or inverting both the position and magnitude of the signal. Other embodiments in which ether transformations or signal smoothing algorithms are applied to one or both signals are possible as well.

Operational flow proceeds to a comparison module 810 which acts as a second validation module and compares the resulting signals after they are processed by the invert module. The comparison module determines whether the first and second signals (as modified by the invert module 808) correspond to the same character. The comparison module can employ various techniques to compare the two signals. For example, both signals can be centered at a known point, with one signal reversed in position (i.e. the x-axis of the charts of FIGS. 6-7) and polarity (the y-axis of the charts of FIGS. 6-7). The resulting signals can be compared to determine if they are substantially identical (e.g. within a predefined margin of error, such as 10%). If the two resulting signals are substantially identical, confidence can be gained that the two signals represent the same character (i.e. the same character was recognized on both a forward and reverse pass of the document reader). In a further example, the signals can be centered and one signal can be reversed in position. The two signals can be added together at each position to determine whether the resulting signal is approximately zero. If the resulting signal is approximately zero, confidence can be gained that the two signals recognize the same character.

If the two signals do not generally correspond using the above or other comparison techniques, a variety of actions can be triggered by different embodiments of the system 800. For example, if both signals correspond to different recognizable characters, the system 800 can select one of the signals as the default signal for which characters are recognized, and that corresponding character can be selected. In another possible embodiment the system 800 takes a "best guess", and the signal that most closely corresponds to a templated character (i.e. the error between that signal and a templated character which it matches is lower than the error between the other signal and a templated character) is selected as the correct signal, and the corresponding character is deemed to be the correct character. In another possible embodiment, an error character is stored instead of selecting either signal as representing the character. In still further embodiments, both an error character and "best guess" or default character are stored. Other embodiments are possible as well.

Other possible algorithms can be used in the comparison module 810 or to provide the validation of characters based on bidirectional magnetic character reading as well.

Operational flow proceeds to a display/store module 812. The display/store module 812 stores the resulting alphanumeric character in a memory of the document reader or a computing system communicatively connected thereto. The display/store module 812 also optionally displays the recognized and stored character to a user, providing feedback to the user for further validation that the correct character is captured. In the case that the comparison module 810 determines that a character cannot be recognized, the display/store module 812 can not store any character, or can store an indication of an unrecognizable character, indicating that the document should be re-scanned.

Operational flow terminates at an end operation 814, which corresponds to completed signal capture and validation of captured signals corresponding to at least one alphanumeric character, as described herein.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A manually-operable document reader comprising:
 a document bed having a document positioning surface;
 a scanner module slidably attached to the document bed, the scanner module including:
 a magnetic character reader;
 a first magnet placed along a leading edge of the magnetic character reader in a first direction of travel of the scanner module;
 a second magnet placed along a leading edge of the magnetic character reader in a second direction of travel of the scanner module opposite to the first direction of travel.

2. The document reader of claim 1, further comprising a contact image sensor incorporated in the scanner module.

3. The document reader of claim 1, wherein the first magnet is configured to induce a magnetic field on a character printed on a document when the scanner module is passed across the document in the first direction of travel, the magnetic field inducing a signal in the magnetic character reader corresponding to the magnetized character.

4. The document reader of claim 3, wherein the second magnet is configured to induce a magnetic field on a character printed on a document when the scanner module is passed across the document in the second direction of travel, the magnetic field inducing a second signal in the magnetic character reader which is inverse to the signal corresponding to the magnetized character.

5. The document reader of claim 1, her comprising circuitry configured to validate a first signal corresponding to a character by comparing the first signal with a second signal.

6. The document reader of claim 5, wherein the second signal is an inverse of the first signal.

7. A method of reading magnetized characters using a manually operated document reader, the method comprising:
 obtaining a signal representative of a magnetized character printed on a document using a manually-operated scanner module passing across a printed document in a first direction, the scanner module including a magnetic character reader;
 obtaining a second signal representative of the magnetized character using the manually operated scanner module passing across the printed document in a second direction;
 validating the signal using the second signal.

8. The method of claim 7, wherein validating the signal includes:
 inverting the second signal; and
 comparing the second signal to the signal.

9. The method of claim 8, further comprising, upon determining that the inverted second signal does not correspond to the first signal, indicating an error.

10. The method of claim 8, further comprising, upon determining that the inverted second signal corresponds to the first signal, storing a character in memory corresponding to the magnetized character printed on the document.

11. The method of claim 8, wherein inverting the second signal includes generating an inverse signal having an opposite position and magnitude of the second signal.

12. The method of claim 11, wherein inverting the second signal further includes replacing the second signal with the inverse signal.

13. The method of claim 7, further comprising capturing an image of the document using a contact image sensor integrated into the scanner module.

14. The method of claim 7, further comprising transmitting the character to a computing system external to the manually operated document reader.

15. A method of operating a manually-operated document reader, the method comprising:
 manually passing a scanner module across a document in a first direction to obtain a signal representative of a magnetized character printed on the document, the scanner module including a magnetic character reader; and
 passing a scanner module across the document in a second direction opposite to the first direction to obtain a second signal representative of the magnetized character printed on the document.

16. The method of claim 15, further comprising viewing the character on a display of a computer.

17. The method of claim 15, further comprising placing the document on a document positioning surface of a document bed.

18. The method of claim 15, wherein manually passing a scanner module across a document in a first direction includes sliding the scanner module along a length of a document positioning surface of a document bed.

* * * * *

UNITED STATES PATENT AND TRADEMARK OFFICE
CERTIFICATE OF CORRECTION

| | | |
|---|---|---|
| PATENT NO. | : 7,949,177 B2 | Page 1 of 1 |
| APPLICATION NO. | : 11/950461 | |
| DATED | : May 24, 2011 | |
| INVENTOR(S) | : John Gudenburr et al. | |

It is certified that error appears in the above-identified patent and that said Letters Patent is hereby corrected as shown below:

In the Claims:

Please correct Claim 5 as follows:

At column 9, claim number 5, line number 36, delete "her" and insert -- further --.

Signed and Sealed this
Twenty-first Day of February, 2012

David J. Kappos
*Director of the United States Patent and Trademark Office*